(12) United States Patent
Takeno

(10) Patent No.: US 11,216,657 B2
(45) Date of Patent: Jan. 4, 2022

(54) COMMODITY RECOGNITION APPARATUS

(71) Applicant: TOSHIBA TEC KABUSHIKI KAISHA, Tokyo (JP)

(72) Inventor: Yuishi Takeno, Numazu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 49 days.

(21) Appl. No.: 16/726,780

(22) Filed: Dec. 24, 2019

(65) Prior Publication Data

US 2020/0134302 A1 Apr. 30, 2020

Related U.S. Application Data

(63) Continuation of application No. 15/857,126, filed on Dec. 28, 2017, now abandoned.

(30) Foreign Application Priority Data

Jan. 16, 2017 (JP) .............................. JP2017-005359

(51) Int. Cl.
*G06K 9/00* (2006.01)
*G06F 3/01* (2006.01)
*G06K 9/32* (2006.01)

(52) U.S. Cl.
CPC .......... *G06K 9/00342* (2013.01); *G06F 3/017* (2013.01); *G06K 9/3241* (2013.01); *G06K 9/00362* (2013.01); *G06K 2209/17* (2013.01)

(58) Field of Classification Search
CPC .................................................. G06K 9/00342
See application file for complete search history.

(56) References Cited

U.S. PATENT DOCUMENTS

2006/0104479 A1\* 5/2006 Bonch-Osmolovskiy ...................
G06K 9/00355
382/103
2013/0027561 A1 1/2013 Lee et al.
(Continued)

FOREIGN PATENT DOCUMENTS

| JP | 5826152 B2 | 12/2015 |
| JP | 2016-192089 A | 11/2016 |
| JP | 2016-220474 A | 12/2016 |

OTHER PUBLICATIONS

Notice of Reasons for Refusal dated Jan. 5, 2021 in corresponding Japanese Patent Application No. 2017-005359 with machine English translation, 4 pages.

*Primary Examiner* — Oneal R Mistry
(74) *Attorney, Agent, or Firm* — Kim & Stewart LLP

(57) ABSTRACT

According to an embodiment, a commodity recognition apparatus includes a first camera configured to image a commodity, a posture sensor configured to acquire information indicating a posture of an operator, and a processor configured to acquire the image of the commodity from the first camera, execute commodity recognition processing on the image of the commodity to identify possible matches to previously registered commodity identities upon determining that the posture of the operator satisfies a specified condition according to information from the posture sensor, cause a plurality of commodity candidates are identified as possible matches in the commodity recognition processing, to be displayed on a display screen, and wait for an operator selection of one commodity candidate from the plurality of commodity candidates displayed on the display screen.

16 Claims, 6 Drawing Sheets

(56) References Cited

U.S. PATENT DOCUMENTS

| | | | |
|---|---|---|---|
| 2014/0140574 A1 | 5/2014 | Takeno | |
| 2016/0012465 A1* | 1/2016 | Sharp | G06Q 20/386 |
| | | | 705/14.17 |
| 2016/0110702 A1 | 4/2016 | Landers, Jr. et al. | |
| 2016/0180509 A1* | 6/2016 | Sato | G06K 9/00 |
| | | | 382/103 |
| 2016/0275363 A1* | 9/2016 | Matsuzaki | G06Q 20/208 |
| 2016/0355352 A1 | 12/2016 | Jones et al. | |
| 2016/0370459 A1* | 12/2016 | Shiraishi | G01S 7/4802 |
| 2017/0278261 A1* | 9/2017 | Focht | G06T 7/136 |
| 2018/0293567 A1* | 10/2018 | Seljeseth | G06Q 30/06 |

* cited by examiner

COMMODITY RECOGNITION APPARATUS

CROSS-REFERENCE TO RELATED APPLICATION

This application is a continuation of U.S. patent application Ser. No. 15/857,126, filed Dec. 28, 2017, which application is based upon and claims the benefit of priority from Japanese Patent Application No. 2017-005359, filed Jan. 16, 2017, the entire contents of which are incorporated herein by reference.

FIELD

Embodiments described herein relate generally to a commodity recognition apparatus.

BACKGROUND

In an existing commodity recognition apparatus, a commodity is recognized based on an image of a commodity obtained with a scanner or a camera while the commodity is held by an operator. If an object is detected, the commodity recognition apparatus executes recognition processing to identify possible matches to previously registered commodity identities. There may be more than one possible match that is identified in the recognition processing. If such is the case, the commodity recognition apparatus displays the commodity candidates for selection of a particular candidate by the operator.

However, a conventional commodity recognition apparatus will sometimes detect an object that is not actually a commodity to be identified and attempt the commodity recognition processing on this detected object. For example, if an arm or a shoulder of the operator unintentionally appears in the scanner imaging window, the commodity recognition apparatus could detect this as a possible commodity then start the commodity recognition processing unnecessarily. If the commodity recognition apparatus executes the commodity recognition processing based on an image of an unintended object, the commodity recognition apparatus might display match candidates and delay further processing for a selection input by the operator. If the commodity recognition apparatus waits for the selection of a candidate by the operator, the operator will have to perform an operation for clearing the erroneously displayed candidates, after which the operator will have to re-scan/re-image the commodity again. Such operations may lower efficiency of the commodity registration.

DETAILED DESCRIPTION

In general, according to one embodiment, a commodity recognition apparatus includes a first camera configured to image a commodity, a posture sensor configured to acquire information indicating a posture of an operator, and a processor configured to acquire the image of the commodity from the first camera, execute commodity recognition processing on the image of the commodity to identify possible matches to previously registered commodity identities upon determining that the posture of the operator satisfies a specified condition according to information from the posture sensor, cause a plurality of commodity candidates that are identified as possible matches in the commodity recognition processing, to be displayed on a display screen, and wait for an operator selection of one commodity candidate from the plurality of commodity candidates displayed on the display screen.

Hereinafter, an example of a sales transaction registration system including a commodity recognition apparatus will be explained with reference to the drawings.

Figure 1:
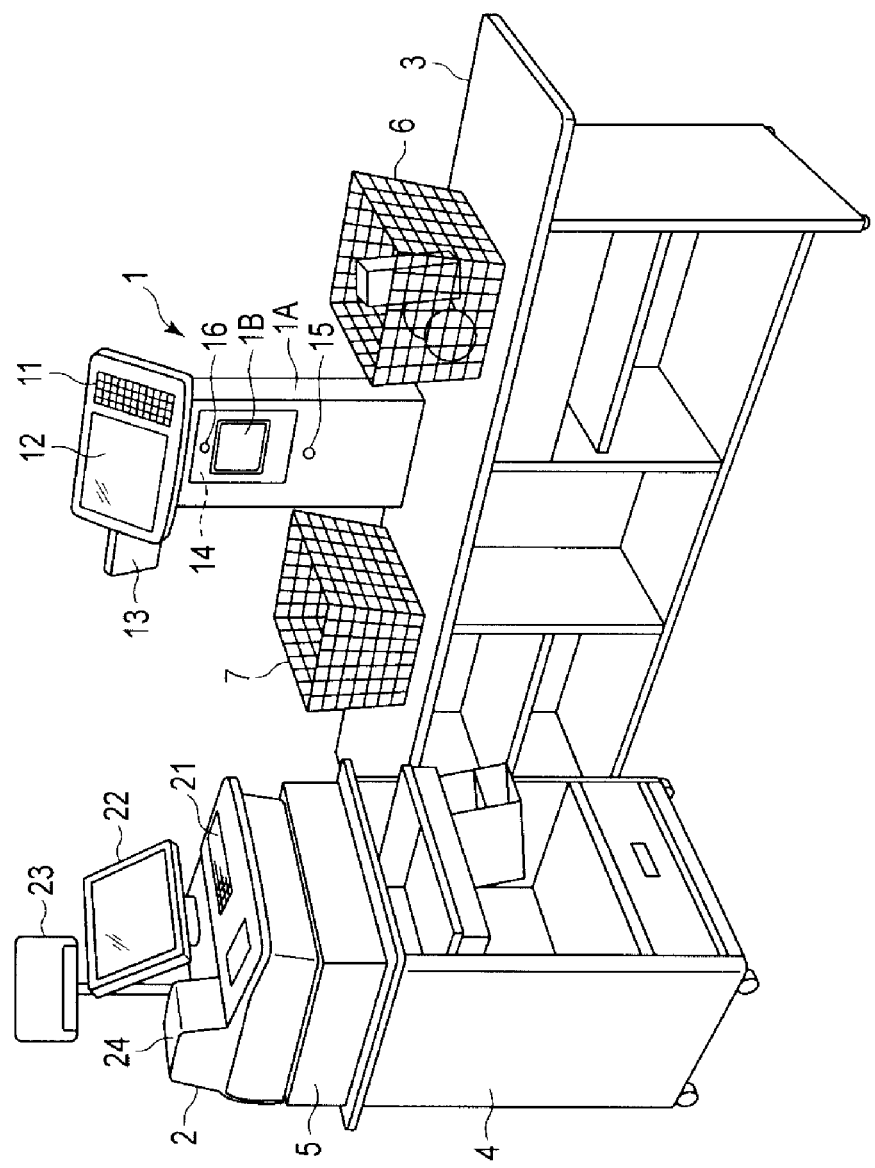
FIG. 1 is a diagram of a sales transaction registration system including a commodity recognition apparatus according to an embodiment.

FIG. 1 is an exterior view of a sales transaction registration system including a commodity recognition apparatus 1 according to an embodiment.

The sales transaction registration system includes the commodity recognition apparatus 1 and a point-of-sale (POS) terminal 2. The commodity recognition apparatus 1 recognizes and registers a commodity being purchased by a customer. The POS terminal 2 performs settlement processing according to a price for the commodity recognized and registered by the commodity recognition apparatus 1. The sales transaction registration system is, for example, a system that performs accounting processing for a commodity purchased by a customer in a store such as a retail store. In the following explanation, it is assumed a store clerk, also referred to as a cashier, acts as an operator of the sales transaction registration system and carries out sales transaction processing including commodity recognition processing. However, in other embodiments, the sales transaction registration system may be a self-service system in which a customer acts as an operator and carries out the sales transaction processing including the commodity recognition processing.

In the configuration example shown in FIG. 1, the commodity recognition apparatus 1 is attached on a checkout counter 3. The commodity recognition apparatus 1 includes a housing 1A, a keyboard 11, a touch panel 12, and a customer display 13. The POS terminal 2 is on a register table 4 via a drawer 5. The POS terminal 2 includes a keyboard 21, an operator display 22, a customer display 23, and a receipt printer 24. The commodity recognition apparatus 1 and the POS terminal 2 are electrically connected via a communication cable 400 (see FIG. 2).

The checkout counter 3, on which the commodity recognition apparatus 1 is set, has an elongated shape generally paralleling a passage way through which the customer passes. The register table 4, on which the POS terminal 2 is set, is placed on a downstream side with respect to a moving direction of the customer along the checkout counter 3. The register table 4 is placed substantially perpendicularly to the checkout counter 3. The checkout counter 3 and the register table 4 are spaced such that the store clerk acting as the operator can perform work in-between.

In the commodity recognition apparatus 1, the keyboard 11, the touch panel 12, and the customer display 13 are attached to the housing 1A. The housing 1A houses a computer that functions as a control unit and performs the commodity recognition processing. Further, the housing 1A includes a camera 14, a buzzer 15, and a posture sensor 16. In the configuration example shown in FIG. 1, the housing 1A has a thin rectangular shape and is erected substantially from the center of the checkout counter 3. The keyboard 11 and the touch panel 12 are respectively attached to the housing 1A with operation surfaces thereof directed to the store clerk acting as the operator. The customer display 13 is attached to the housing 1A with a display surface directed to the passage side on which the customer passes.

The housing 1A includes a reading window 1B. The reading window 1B is an opening through which the camera 14 in the housing 1A photographs a commodity. In the configuration example shown in FIG. 1, the reading window 1B is formed in a rectangular shape on the operator side of the housing 1A. The camera 14 includes an imaging sensor, a driving circuit, an optical system, and the like. The imaging sensor is, for example, a CCD (Charge Coupled Device) array. The driving circuit drives the imaging sensor. The optical system includes an imaging lens for forming an image of an imaging region photographed from the reading window 1B on the CCD imaging element. The imaging region corresponds to a region of a frame image formed in an area of the CCD imaging element from the reading window 1B through the imaging lens. The camera 14 outputs the image of the imaging region formed on the CCD imaging element.

Note that the camera 14 is not limited to particular configuration explained above. Any camera that acquires, as image data, an image including a commodity can be used for commodity recognition purposes.

In the configuration shown in FIG. 1, a basket 6 and a basket 7 are disposed on either sides of the housing 1A on the checkout counter 3. Commodities that have not been through the commodity recognition processing (referred to as unrecognized commodities) are stored in the basket 6. Commodities that have been through the commodity recognition processing (referred to as registered commodities) are put in the basket 7. The basket 6 is placed on an upstream side of the housing 1A, with upstream and downstream being defined here with respect to an anticipated moving direction of the customer along the checkout counter 3. The basket 7 is placed on a downstream side of the housing 1A.

For example, the customer places a basket 6, in which unrecognized commodities M that the customer desires to purchase are stored, on the checkout counter 3. The operator takes out the commodities one by one from the basket 6 and holds up each over the reading window 1B. In accordance with an instruction by the operator, the camera 14 acquires an image for each commodity through the reading window 1B. After the commodity recognition processing on the image acquired by the camera 14 is completed, the operator puts the now-recognized commodity in a basket 7.

The posture sensor 16 is a sensor that detects information for estimating a position of the operator. Any sensor that acquires the position information of the operator so as to permit a determination as to whether the operator, or a customer in the case of a self-service register, is presently holding a commodity over the reading window 1B can be used as the posture sensor 16. For example, the posture sensor 16 may be a camera, may be a distance measurement sensor, or may be a proximity sensor. The camera 14 may also be used as the posture sensor 16.

Figure 2:
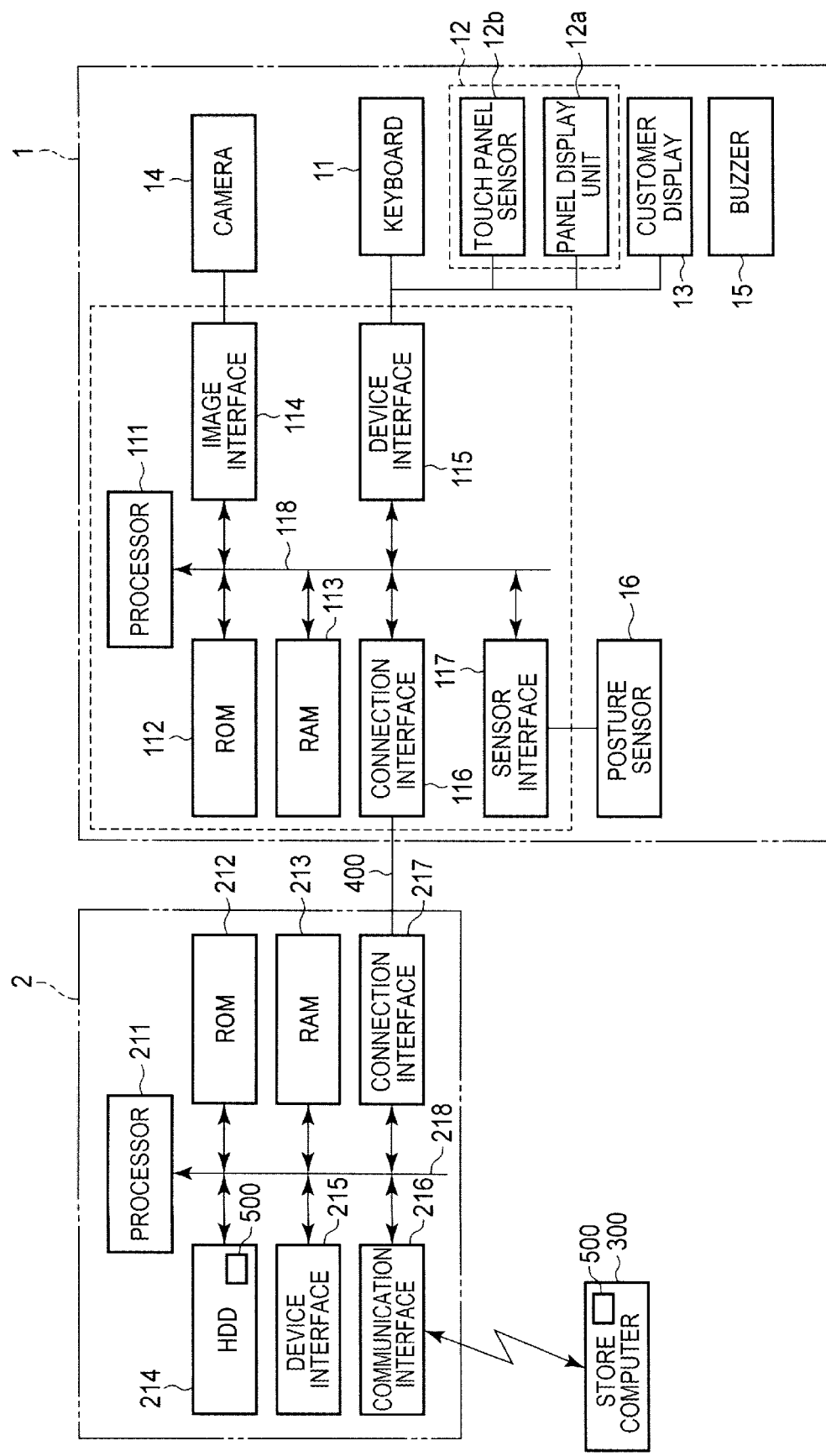
FIG. 2 is a block diagram of a commodity recognition apparatus and a POS terminal.

FIG. 2 is a block diagram of the commodity recognition apparatus 1 and the POS terminal 2.

The commodity recognition apparatus 1 includes a processor 111, a ROM (Read Only Memory) 112, a RAM (Random Access Memory) 113, an image interface 114, a device interface 115, a connection interface 116, and a sensor interface 117. The processor 111 is connected to the ROM 112, the RAM 113, and the interfaces 114, 115, 116, and 117 via a bus line 118 such as an address bus or a data bus.

The processor 111 executes a computer program, stored for example in ROM 112, by which the processor 111 realizes various kinds of operations and functions. The processor 111 is, for example, a CPU (Central Processing Unit). The ROM (Read Only Memory) 112 stores computer programs and control data. The RAM 113 is a volatile memory that stores data as a work area. The RAM 113 stores data that the processor 111 is processing or manipulating according to execution of a computer program.

The image interface 114 is an interface component that connects to the camera 14. The processor 111 captures, via the image interface 114, image data photographed by the camera 14. The processor 111 stores, in the RAM 113, the image data from the camera 14.

The device interface 115 is an interface component that connects to the keyboard 11, the touch panel 12, and the customer display 13. The touch panel 12 includes a display unit 12a and a touch sensor 12b. The touch sensor 12b is disposed on a screen of the display unit 12a. The device interface 115 may also connect to the buzzer 15. The buzzer 15 emits, for example, an alarm sound. The buzzer 15 can receive a control instruction from the processor 111 via the device interface 115 causing an alarm to sound.

The connection interface 116 is an interface component that connects to the POS terminal 2. In the configuration shown in FIG. 2, the connection interface 116 is connected to the POS terminal 2 via the communication cable 400. Any interface method that permits communication with the POS terminal 2 can be used as the connection interface 116. For example, an interface for wireless communication can be used as the connection interface 116.

The sensor interface 117 is an interface component that connects to the posture sensor 16. The sensor interface 117 complies with the communication requirements of the posture sensor 16. If the camera 14 is used as the posture sensor 16, the sensor interface 117 may be omitted as a separate component.

The POS terminal 2 includes, as shown in FIG. 2, a processor 211, a ROM 212, a RAM 213, a HDD (Hard Disk Drive) 214, a device interface 215, a communication interface 216, and a connection interface 217. The processor 211 is connected to the ROM 212, the RAM 213, the HDD 214, and the interfaces 215, 216, and 217 via a bus line 218, such as an address bus or a data bus.

The processor 211 executes a computer program. For example, the processor 211 realizes various kinds of processing by executing computer programs stored by the ROM 212. The processor 211 is, for example, a CPU (Central Processing Unit). The ROM 212 stores computer programs, control data, and the like. The RAM 213 is a volatile memory that stores data for use as a work area. The RAM 213 stores data that the processor 211 processing or manipulating according to a control program being executed by the processor 211. The HDD 214 is a data storage unit. The data storage unit is not limited to the HDD and may be, for example, a SSD (Solid State Drive).

The device interface 215 is an interface component that connects to the keyboard 21, the operator display 22, the customer display 23, the printer 24, and the drawer 5.

The communication interface 216 is an interface component that connects to a store computer 300. The communication interface 216 communicates with the store computer 300 via a network such as a LAN (Local Area Network). The processor 211 is capable of transmitting and receiving data to and from the store computer 300 via the communication interface 216. For example, the processor 211 receives a dictionary file 500 for commodity recognition from the store computer 300 via the communication interface 216. The processor 211 saves the dictionary file 500 received from the store computer 300 in the HDD 214.

The connection interface 217 is an interface component that permits communication with the commodity recognition apparatus 1. In the configuration example shown in FIG. 2, the connection interface 217 is connected to the connection interface 116 of the commodity recognition apparatus 1 via the communication cable 400. For example, the processor 211 controls display of the touch panel 12 and the customer display 13 of a commodity recognition apparatus 1 via the connection interface 217 or the like. The processor 111 of the commodity recognition apparatus 1 accesses the dictionary file 500 in the HDD 214 of the POS terminal 2 through communication via the connection interface 217 or the like.

The dictionary file 500 includes data for identifying each commodity being sold at the store. For example, the dictionary file 500 includes reference image data and feature value data associated with each commodity ID and a corresponding commodity name of each commodity. The reference image data can be image data obtained by photographing the particular commodity associated with each commodity ID under various conditions. For example, the reference image data can be obtained by photographing the commodity from various directions. The feature value data is parametric data obtained by analysis of feature values in reference images. The feature value data is collated with feature values in a commodity images used in commodity recognition processing.

Processing functions in the commodity recognition apparatus 1 will be explained below.

The commodity recognition apparatus 1 has various processing functions that are realized by the processor 111 executing a computer program or programs. The processor 111 executes the computer programs stored in the ROM 112, whereby the commodity recognition apparatus 1 realizes various processing functions such as commodity registration processing including the commodity recognition processing. For example, the commodity recognition apparatus 1 has an image acquiring function, an image detecting function, a feature-value extracting function, a similarity-degree calculating function, a commodity specifying function, and a result output function as processing functions for recognizing a commodity.

In the commodity recognition apparatus 1 according to this example embodiment, object recognition is adopted as a technique for commodity recognition. The object recognition is a technique for recognizing, from image data of a photographed image including an object, a type or category of the object. For example, the object recognition is realized by a processor in a computer executing a computer program. The image data is acquired and feature values for recognition an object included in the acquired image data are extracted. The degrees of similarity are then calculated using feature values extracted from the image and feature value data already recorded as dictionary data. The object recognition is performed in accordance with the calculated degree (s) of similarity.

The image acquiring function is a function of acquiring an image from the camera 14. The camera 14 photographs a commodity held in front of the reading window 1B to obtain an image. The processor 111 acquires the image via the image interface 114.

The image detecting function is a function of detecting a commodity image in the image from the camera 14. The processor 111 detects an image region corresponding to the commodity in the image from the camera 14. The processor 111 segments the image region of the commodity and sets the image region as a commodity image.

The feature-value extracting function is a function of extracting a feature value from the commodity image. The processor 111 extracts feature values of the commodity using an algorithm adopted for commodity recognition processing.

The similarity-degree calculating function is a function of calculating similarity degrees by reference to the feature values extracted from the commodity image and the feature value data of the commodities registered as dictionary data. The processor 111 calculates similarity degrees of the feature values obtained from the commodity image and the feature value data in the dictionary file 500 for the commodities.

The commodity specifying function is a function of specifying the commodity of the image from the camera 14 in accordance with the similarity-degree calculating function based on feature values. The processor 111 identifies the commodity in the commodity image in accordance with the similarity degrees or, alternatively, selects multiple commodity candidates. For example, if there is only one commodity having a similarity degree equal to or larger than some predetermined threshold value, the processor 111 specifies the commodity in is this one commodity in the dictionary file 500 meeting or exceeding the threshold value. If there is no commodity in the dictionary file having a similarity degree equal to or greater than the predetermined threshold or if there is a plurality of commodities having similarity degrees equal to or greater than the predetermined threshold, the processor 111 selects multiple commodity candidates in a descending order of the similarity degrees.

If a plurality of commodity candidates is identified and provided, the operator is required to select one commodity from the candidates to specify the commodity in the commodity image.

The result output function is a function of outputting information indicating the commodity specified by the commodity specifying function to the POS terminal 2. If the commodity is specified by the commodity specifying function, the processor 111 outputs a commodity ID of the specified commodity to the POS terminal 2 as matching the commodity photographed by the camera 14.

The processor 111 may include a code recognizing function for recognizing a code (e.g., a barcode or a two-dimensional code) for specifying a commodity from the commodity image. If the code can be detected in the commodity image, the processor 111 may recognize a commodity associated with the code. If the code cannot be detected, the processor 111 may recognize a commodity according to the object recognition. However, in the following explanation, it is assumed that the commodity recognition apparatus 1 recognizes the commodity according to the object recognition processing.

A flow of accounting processing in the sales transaction registration system will be explained below.

Figure 3:
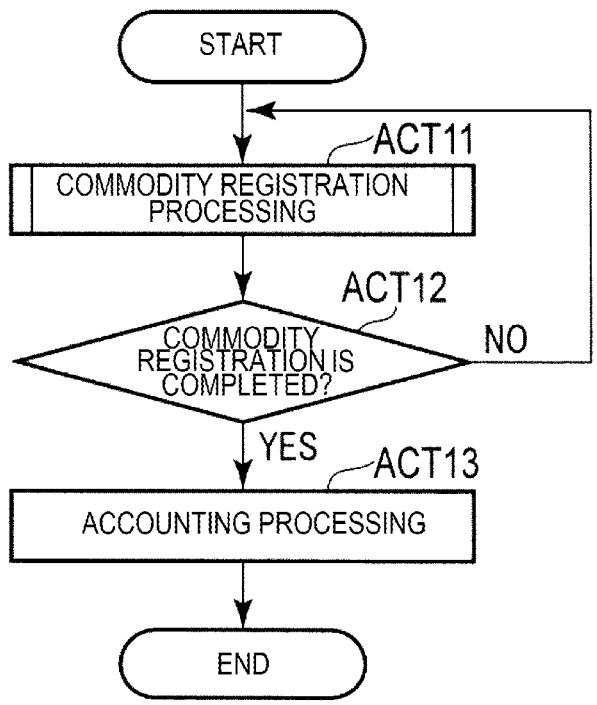
FIG. 3 is a schematic flowchart of accounting processing in a sales transaction registration system including a commodity recognition apparatus.

FIG. 3 is a schematic flowchart of the accounting processing in the sales transaction registration system.

As shown in FIG. 3, the sales transaction registration system performs commodity registration processing for registering commodities purchased by the user and accounting processing for settling prices of all the commodities registered by the commodity registration processing. The commodity registration processing includes specifying individual commodities purchased by the user or the customer according to commodity recognition by the objet recognition.

A customer searches for commodities to purchase in the store and puts commodities to be purchased in the basket 6. The customer carries the basket 6 to the checkout counter 3. The customer or the store clerk places the basket 6 on the near side of the housing 1A on the upstream side of the checkout counter 3. The operator, who can be the store clerk or the user, takes out the commodities from the basket 6 one by one and holds the commodity over the reading window 1B. If the recognition of the commodity held over the reading window 1B is successful, the operator puts the commodity in the basket 7.

The commodity recognition apparatus 1 registers a commodity specified by the commodity recognition processing for an image photographed by the camera 14 (ACT 11). The commodity recognition apparatus 1 photographs, with the camera 14, images of individual commodities held over the reading window 1B. The commodity recognition apparatus 1 performs the commodity recognition processing on the images photographed by the camera 14. In the commodity recognition processing, the commodity recognition apparatus 1 also acquires posture information for estimating a posture or position of the operator from the posture sensor 16 and monitors the position of the operator. If determining, by reference to the posture information, that the posture of the operator allows the commodity recognition processing to be executed, the commodity recognition apparatus 1 continuously carries out the commodity recognition processing for the commodities.

The commodity registration processing including the commodity recognition processing will be explained in detail below. It is assumed that the processor 111 carries out the commodity registration process and supplies information indicating the registered commodities to the POS terminal 2. However, the processor 211 of the POS terminal 2 may instead carry out the commodity recognition processing.

If the commodity registration processing is completed and all commodities are registered, the operator instructs registration completion with the key board 11 or the touch panel 12 of the image recognition apparatus 1. That is, after the commodity registration processing is started, the commodity recognition apparatus 1 receives the instruction for the registration completion of the commodities by the operator (ACT 12). If the registration completion of the commodities is not instructed (NO in ACT 12), the commodity recognition apparatus 1 continues to execute the commodity registration processing.

If the registration completion is instructed (YES in ACT 12), the commodity recognition apparatus 1 starts the accounting processing by the POS terminal 2 for the registered commodities (ACT 13). For example, the processor 211 acquires commodity IDs of the registered commodities from the commodity recognition apparatus 1. If the processor 211 acquires the commodity IDs of the registered commodities, the processor 211 then specifies commodity prices of the commodities in accordance with the acquired commodity IDs.

The processor 211 calculates a settlement amount for all the commodities that have been registered by totaling the commodity prices of the registered commodities. After calculating the settlement amount, cash or payment for settling the calculated settlement amount is then received from the customer. After receiving notification of full payment by the customer, the processor 211 issues a receipt indicating transaction details and ends the sales transaction processing.

A first operation example of the commodity registration processing in the commodity recognition apparatus 1 will be explained below.

Figure 4:
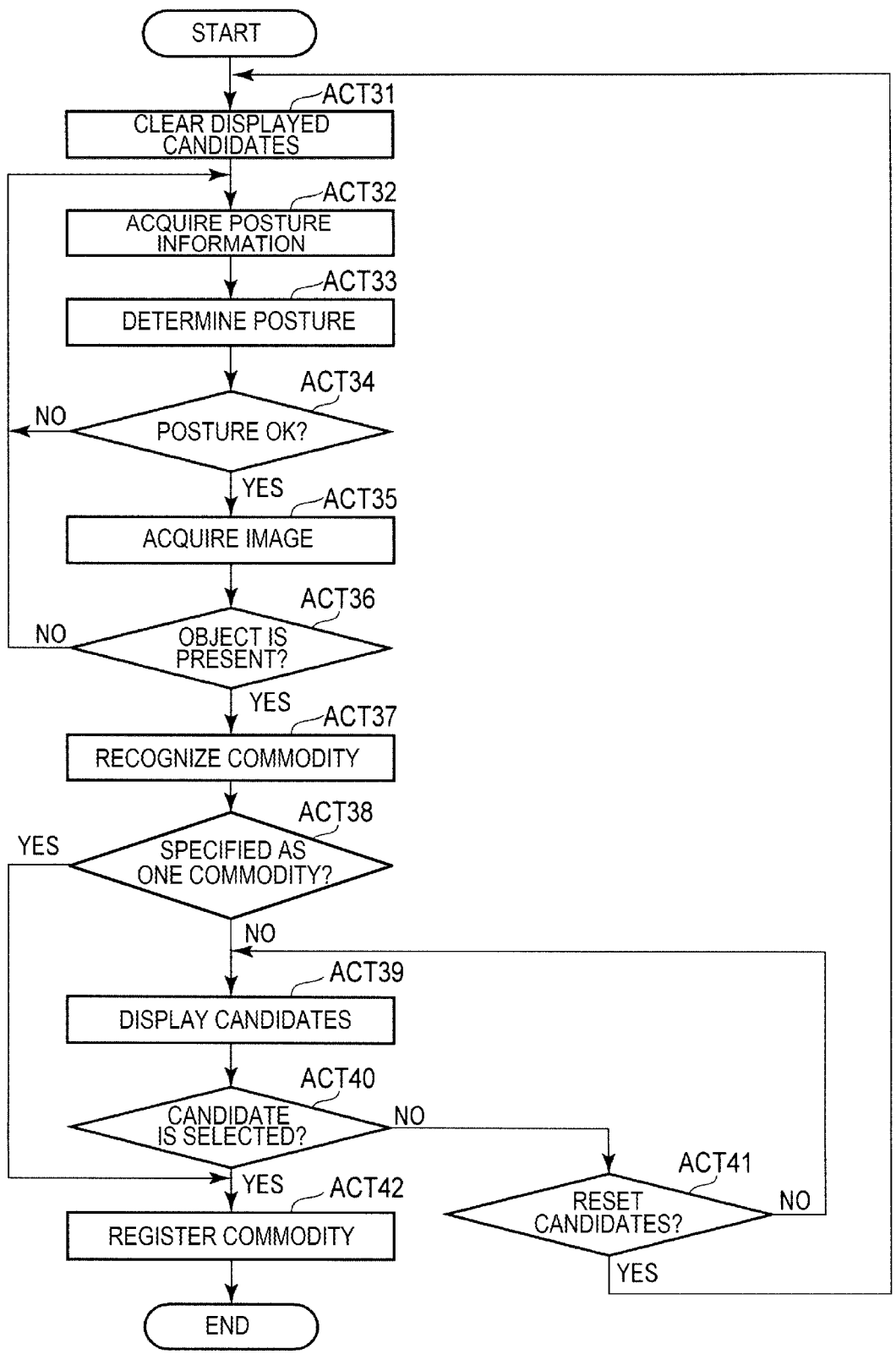
FIG. 4 is a flowchart of a first operation example in a commodity recognition apparatus.

FIG. 4 is a flowchart of the first operation example of the commodity registration processing including the commodity recognition processing in the commodity recognition apparatus 1.

In the first operation example, first, the processor 111 of the commodity recognition apparatus 1 clears display content of the touch panel 12 (ACT 31) and starts the commodity registration processing. After starting the commodity registration processing, the processor 111 acquires information indicating a posture or position of the operator, also referred to as posture information, from the posture sensor 16 (ACT 32). After acquiring the posture information from the posture sensor 16, the processor 111 determines in accordance with the acquired posture information whether the operator is in a posture that allows the commodity recognition processing to be executed (ACT 33). The processor 111 determines, according to whether the posture information acquired from the posture sensor 16 satisfies a previously specified condition, whether the operator is in the posture that allows the commodity recognition processing to be executed.

If the posture sensor 16 is a sensor that acquires body frame or position information, the processor 111 estimates the posture of the operator according to the body frame or position information serving as the posture information acquired by the posture sensor 16. If the posture sensor 16 is a camera, the processor 111 estimates the posture of the operator from an image photographed by the camera functioning as the posture sensor 16. If the posture sensor 16 is a proximity sensor, the processor 111 estimates the posture or the position of the operator according to a detection signal of the proximity sensor functioning as the posture sensor 16.

In the first operation example, it is assumed that the posture that allows the commodity recognition processing to be executed is a posture in which the operator is holding or can hold a commodity over the reading window 1B. For example, the posture that allows the commodity recognition processing to be executed may be postures such as an "upright state", "the position of the head is within a predetermined range", and "the face is facing front towards the camera 14". A state in which the operator is not close to the proximity sensor functioning as the posture sensor 16 provided in a predetermined position (e.g., above the touch panel 12) may be the posture that allows the commodity recognition processing to be executed.

For example, the processor 111 can determine according to the posture information (e.g., the body position information) acquired by the posture sensor 16 whether the operator is in an upright state. If a condition that the posture information indicates the upright state of the operator is set as the specified condition, the processor 111 determines according to the posture information acquired by the posture sensor 16 whether the operator is in the upright posture.

If the posture sensor 16 is a camera, the processor 111 can estimate a position of the head of the operator from an image photographed by the camera functioning as the posture sensor 16 (If an allowable range for the position of the head is set as the specified condition, the processor 111 determines whether the position of the head specified from the posture information is within the allowable range.

If the posture sensor 16 is a camera, the processor 111 can estimate a direction of the face of the operator from the image photographed by the camera serving as the posture sensor 16. If the direction of the face is set as the specified condition, the processor 111 determines whether the direction of the face specified from the posture information is the direction set as the specified condition.

If determining that the operator is in the posture that allows the commodity recognition processing to be executed (YES in ACT 34), the processor 111 acquires a photographed image from the camera 14 with the image acquiring function (ACT 35). That is, the processor 111 captures a photographed image as a frame image from the camera 14 via the image interface 114. The processor 111 stores the photographed image captured via the image interface 114 in the RAM 113.

The processor 111 performs processing for detecting a commodity image in the photographed image acquired from the camera 14 (ACT 36). The processor 111 detects a region of an object estimated as a commodity from the photographed image stored in the RAM 113 to thereby determine whether an object is present in the photographed image. For example, the processor 111 extracts or detects a contour line or the like from an image obtained by binarizing the photographed image. The processor 111 attempts extraction of a contour of the object estimated as the commodity from the binarized image. After extracting the contour of the object, the processor 111 regards the inside of the extracted contour as an image region, referred to as a commodity image, of the commodity.

If determining that an object is absent in the photographed image, that is, if a commodity image cannot be extracted from the photographed image (NO in ACT 36), the processor 111 returns to ACT 32. In this case, when the posture information acquired from the posture sensor 16 satisfies the specified condition, the processor 111 captures the next photographed image from the camera 14. That is, when the posture information satisfies the specified condition, the processor 111 sequentially captures photographed images from the camera 14 until a commodity image can be extracted. Every time the processor 111 captures the photographed image from the camera 14, the processor 111 executes extraction processing for a commodity image. Therefore, if the commodity is held over the reading window 1B such that the posture information satisfies the specified condition, the processor 111 extracts a commodity image from the photographed image of the camera 14 and starts the commodity recognition processing.

If determining that an object is present in the photographed image, that is, if a commodity image can be extracted from the photographed image (YES in ACT 36), the processor 111 executes the commodity recognition processing for the commodity image (ACT 37).

In the commodity recognition processing, the processor 111 recognizes a commodity with the object recognition by the feature-value extracting function, the similarity-degree calculating function, and the commodity specifying function. That is, the processor 111 extracts, with the feature-value extracting function, feature values used for the object recognition from the commodity image. After extracting the feature values from the commodity image, the processor 111 calculates, with the similarity-degree calculating function, similarity degrees of the extracted feature values and the feature value data of the dictionary file 500 of the commodities. The processor 111 determines whether the similarity degrees for the commodities calculated by the commodity specifying function are equal to or larger than the threshold.

If there is one commodity having a similarity degree equal to or larger than the threshold, that is, if only one commodity having sufficiently high accuracy of a recognition result is obtained, the processor 111 specifies that a commodity of the commodity image is the commodity having the similarity degree equal to or larger than the threshold (YES in ACT 38). If a commodity is specified as one commodity by the commodity recognition processing, the processor 111 registers the specified commodity as a settlement target commodity without involving operation by the operator (ACT 42). That is, if a commodity can be uniquely specified by the commodity recognition processing, the processor 111 automatically registers the specified commodity without involving operation by the operator. This function may be referred to as an automatic decision function.

If there is no commodity having a similarity degree equal to or larger than the threshold (NO in ACT 38), the processor 111 selects a plurality of commodity candidates in the descending order of similarity degrees. If there are a plurality of commodities having similarity degrees equal to or larger than the threshold (NO in ACT 38), the processor 111 selects the plurality of commodities having the similarity degrees equal to or larger than the threshold as commodity candidates. After selecting the plurality of commodity candidates, the processor 111 displays the selected plurality of commodity candidates on the touch panel 12 (ACT 39).

Figure 5:
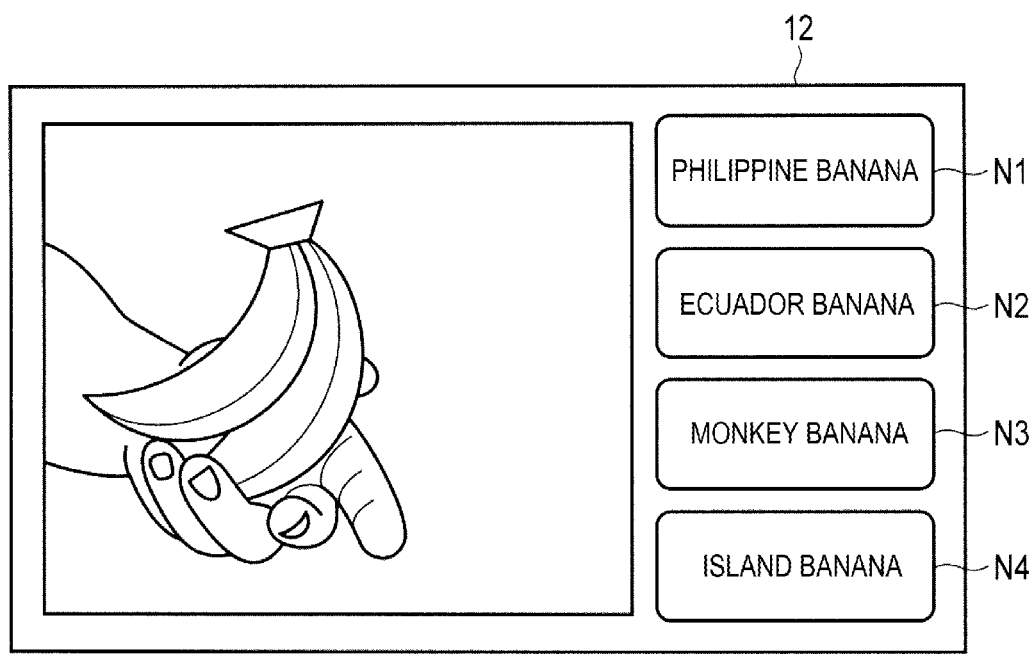
FIG. 5 is a diagram of a plurality of commodity candidates in a commodity recognition apparatus.

FIG. 5 is a display example including a plurality of commodity candidates obtained in the commodity recognition processing.

In the display example shown in FIG. 5, the touch panel 12 displays a commodity image and displays a plurality of icons N1 to N4 indicating a plurality of commodity candidates. The icons N1 to N4 are buttons selectable by the touch sensor 12b of the touch panel 12. The icons N1 to N4 respectively indicate the commodity candidates. The processor 111 detects a touch on any one of the icons N1 to N4.

If the plurality of commodity candidates is selected, the processor 111 displays the selectable commodity candidates as shown in FIG. 5 to thereby receive selection of a commodity candidate by the operator (ACT 40). The processor 111 displays the selectable commodity candidates and receives an instruction for reset of the commodity candidates, or retrial of the commodity recognition processing, by the keyboard 11 or the touch panel 12 (ACT 41). If the reset of the commodity candidates is instructed (YES in ACT 41), the processor 111 returns to ACT 31, clears the commodity candidates, and executes the processing explained above again. If the operator selects any one of the commodity candidates (YES in ACT 40), the processor 111 registers the commodity candidate selected by the operator as a settlement target commodity (ACT 42).

If the plurality of commodity candidates is displayed, the processor 111 maintains the display until the operator selects any one of the commodity candidates or the operator instructs to reset. While maintaining the display, the processor 111 stops the commodity recognition processing. However, the processor 111 may repeatedly carry out the processing in ACTS 35 to 38 while maintaining the display of the plurality of commodity candidates. In this case, if one commodity having a similarity degree equal to or larger than the threshold can be specified, the processor 111 may register, with the automatic decision function, the commodity having the similarity degree equal to or larger than the threshold.

In the first operation example, the commodity recognition apparatus determines in accordance with the posture information acquired by the posture sensor whether the operator is in the posture that allows the commodity recognition processing to be executed. If determining, according to the posture information, that the operator is in the posture that allows the commodity recognition processing to be executed, the commodity recognition apparatus executes the commodity recognition processing.

Consequently, the commodity recognition apparatus can prevent the commodity recognition processing unintentionally being executed when an object other than a commodity such as an arm or a shoulder of the operator approaches the reading window. For example, when the operator takes commodities out from a basket, even if the arm, the shoulder, or the like unintentionally approaches the reading window or the camera, it is possible to prevent the commodity recognition processing from being executed. As a result, unnecessary commodity candidates are not displayed by the commodity recognition processing for an unintended photographed image (a photographed image of an object other than a commodity). Useless reset operation and the like are unnecessary.

A second operation example of the commodity registration processing in the commodity recognition apparatus 1 will be explained.

Figure 6:
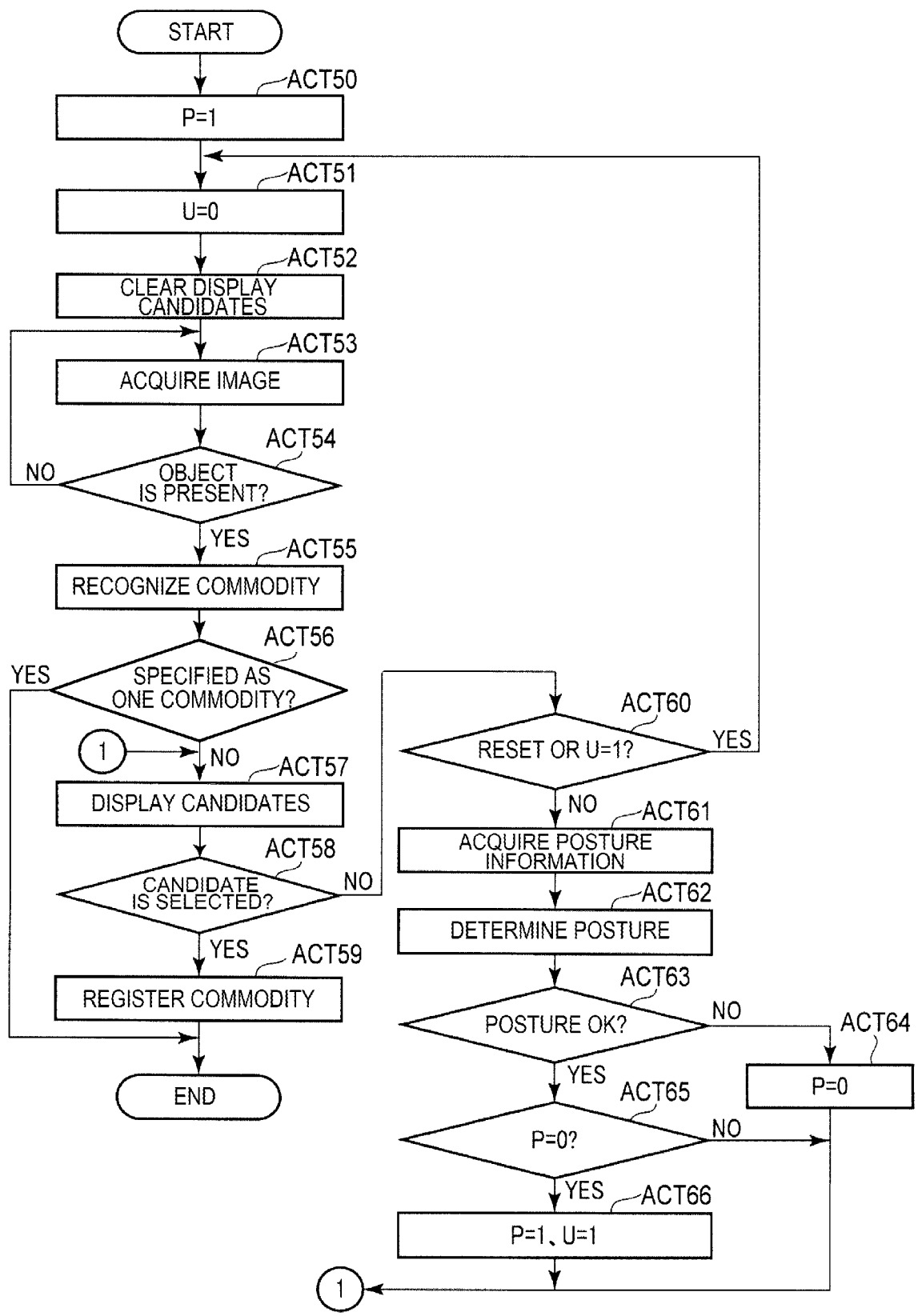
FIG. 6 is a flowchart of a second operation example in a commodity recognition apparatus.

FIG. 6 is a flowchart of the second operation example of the commodity registration processing including the commodity recognition processing in the commodity recognition apparatus 1.

In the second operation example, first, the processor 111 of the commodity recognition apparatus 1 defines a posture flag P and an update flag U. For example, the processor 111 sets the posture flag P and the update flag U on the RAM 113. After setting the posture flag P and the update flag U, the processor 111 sets an initial value of the posture flag P to 1 (ACT 50) and sets an initial value of the update flag U to 0 (ACT 51).

After setting the posture flag P and the update flag U to the initial values, the processor 111 clears display content of the touch panel 12 (ACT 52) and starts the commodity registration processing. After starting the commodity registration processing, the processor 111 acquires a photographed image with the image acquiring function (ACT 53). That is, the processor 111 captures, via the image interface 114, a photographed image as a frame image from the camera 14. The processor 111 stores the photographed image captured via the image interface 114 in the RAM 113.

The processor 111 performs processing for detecting a commodity image in the photographed image acquired from the camera 14 using the image detecting function (ACT 54). The processor 111 detects a region of an object estimated as a commodity from the photographed image stored in the RAM 113 to thereby determine whether an object is present in the photographed image.

If determining that an object is absent in the photographed image, that is, if a commodity image cannot be extracted from the photographed image (NO in ACT 53), the processor 111 returns to ACT 53 and acquires the next photographed image. That is, the processor 111 sequentially captures photographed images as frame images until a commodity image can be extracted. Every time the processor 111 captures a photographed image from the camera 14, the processor 111 executes the extraction processing for a commodity image.

If determining that an object is present in the photographed image, that is, if a commodity image can be extracted from the photographed image (YES in ACT 54), the processor 111 executes the commodity recognition processing for the commodity image (ACT 55). The processor 111 extracts feature values used for the object recognition from the commodity image. The processor 111 calculates similarity degrees of the extracted feature values and the feature value data of the dictionary file 500 of the commodities. The processor 111 determines whether the calculated similarity degrees for the commodities are equal to or larger than the threshold.

If the processor 111 specifies one commodity having a similarity degree equal to or larger than the threshold (YES in ACT 56), the processor 111 registers the commodity having the similarity degree equal to or larger than the threshold as a settlement target commodity (ACT 59).

If there is no commodity having a similarity degree equal to or larger than the threshold (NO in ACT 56), the processor 111 selects a plurality of commodity candidates in the descending order of the similarity degrees. If there is a plurality of commodities having similarity degrees equal to or larger than the threshold (NO in ACT 56), the processor 111 selects the plurality of commodities having the similarity degrees equal to or larger than the threshold as commodity candidates. After selecting the plurality of commodity candidates, the processor 111 displays the selected plurality of commodity candidates on the touch panel 12 (ACT 57).

The processor 111 receives selection of a commodity candidate by the operator by displaying the plurality of commodity candidates in a selectable state. If the operator selects any one of the commodity candidates (YES in ACT 58), the processor 111 registers the commodity selected by the operator as a settlement target commodity (ACT 59).

The processor 111 displays the plurality of commodity candidates and receives an instruction to reset the displayed commodity candidates. If the reset of the commodity candidates is instructed or if the update flag U is 1 (YES in ACT 60), the processor 111 returns to ACT 51, clears the commodity candidates, and executes the processing explained above again.

Further, the processor 111 displays the plurality of commodity candidates and monitors a posture state of the operator (ACTS 61 to 63). That is, the processor 111 acquires information indicating the posture of the operator, also referred to as posture information, from the posture sensor 16 (ACT 61). After acquiring the posture information, the processor 111 determines in accordance with the acquired posture information whether the operator is in a posture permitting successful execution of the commodity recognition processing (ACT 62). The processor 111 determines, according to whether the posture information acquired by the posture sensor 16 satisfies a specified condition, whether the operator is in the posture that will likely allow the commodity recognition processing to be executed successfully. Processing in ACT 62 may be the same processing as ACT 33 explained above.

If determining that the operator is not in the posture that allows the commodity recognition processing to be executed (posture NG) successfully (NO in ACT 63), the processor 111 sets the posture flag P to 0 (ACT 64) and returns to ACT 57.

If determining that the operator is in the posture that allows successful commodity recognition processing to be executed (posture OK) (YES in ACT 63), the processor 111 determines whether the posture flag P is 0 (ACT 65). If the posture flag P is not 0 (NO in ACT 65), the processor 111 returns to ACT 57 without changing the posture flag P and the update flag U. If the posture flag P is 0 (YES in ACT 65), the processor 111 sets the posture flag P to 1 and sets the update flag U to 1 (ACT 66) and returns to ACT 57.

In ACT 66, the processor 111 detects whether the posture of the operator transitions from a state of posture NG (a first state) to a state of posture OK (a second state). For example, if the upright state is the state corresponding to the posture OK state, the update flag U changes to 1 (ON) when the posture of the operator transitions from a non-upright state to the upright state. If the update flag U changes to 1, the processor 111 determines YES in ACT 60 and returns to ACT 51, clears the commodity candidates, and executes the commodity recognition processing again.

In the second operation example, during the display of the commodity candidates, the commodity recognition apparatus monitors, according to the posture information, the transition of the operator's posture from the posture NG to the posture OK. If the posture of the operator transitions from the posture NG to the posture OK, the commodity recognition apparatus clears the displayed commodity candidates and executes the commodity recognition processing again.

Consequently, even if unnecessary commodity candidates are displayed after commodity recognition processing on an unintended photographed image, the unnecessary commodity candidates are cleared once the operator takes a posture for holding a commodity for imagining. If the operator takes the posture for holding a commodity for imagining, the previous commodity candidates are cleared and the commodity recognition processing is executed again to determine candidates according to a newly acquired image of the commodity. Therefore, it is possible to smoothly carry out the commodity recognition processing on an intended photographed image by monitoring changes in the posture of the operator.

While certain embodiments have been described these embodiments have been presented by way of example only, and are not intended to limit the scope of the inventions. Indeed, the novel embodiments described herein may be embodied in a variety of other forms. Furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A commodity recognition apparatus comprising:
    a display;
    a first camera configured to image a commodity;
    a posture sensor configured to detect a posture of an operator holding the commodity over a reading window; and
    a processor configured to
        acquire, from the first camera, the image of the commodity that is held over the reading window,
        upon detecting that the posture of the operator is in an upright state, execute commodity recognition processing on the image of the commodity to identify one or more commodity candidates, and
        control the display to display the identified commodity candidates and then wait for an input that selects one of the commodity candidates, wherein
    the posture sensor detects that the posture of the operator is in an upright state when the head of the operator is located within a predetermined range.

2. The commodity recognition apparatus according to claim 1, wherein
    the processor executes the commodity recognition processing by performing object recognition using a dictionary file.

3. The commodity recognition apparatus according to claim 2, further comprising:
    a storage device that stores the dictionary file.

4. The commodity recognition apparatus according to claim 1, wherein
    the posture sensor is a second camera.

5. The commodity recognition apparatus according to claim 1, wherein
    the first camera is also configured as the posture sensor.

6. A commodity recognition apparatus comprising:
    a display;
    a first camera configured to image a commodity;
    a posture sensor configured to detect a posture of an operator holding the commodity over a reading window; and
    a processor configured to
        acquire, from the first camera, the image of the commodity that is held over the reading window,
        upon detecting that the posture of the operator is in an upright state, execute commodity recognition processing on the image of the commodity to identify one or more commodity candidates,
        control the display to display the identified commodity candidates and then wait for an input that selects one of the commodity candidates, and
        during the waiting, upon detecting that the posture of the operator is not in an upright state,
            control the display not to display the identified commodity candidates,
            acquire another image of the commodity from the first camera, and
            execute the commodity recognition processing on said another image of the commodity.

7. The commodity recognition apparatus according to claim 6, wherein
    the processor executes the commodity recognition processing by performing object recognition using a dictionary file.

8. The commodity recognition apparatus according to claim 7, further comprising:
    a storage device that stores the dictionary file.

9. The commodity recognition apparatus according to claim 6, wherein
    the posture sensor detects that the posture of the operator is in an upright state when the head of the operator is located within a predetermined range.

10. The commodity recognition apparatus according to claim 6, wherein
    the posture sensor detects that the posture of the operator is in an upright state when the face of the operator is facing towards the first camera.

11. The commodity recognition apparatus according to claim 6, wherein
    the posture sensor is a second camera.

12. The commodity recognition apparatus according to claim 6, wherein
    the first camera is also configured as the posture sensor.

13. A method for commodity recognition, the method comprising:
    acquiring an image of a commodity that is held by an operator over a reading window;
    detecting a posture of the operator holding the commodity over the reading window;

upon detecting that the posture of the operator is in an upright state, executing commodity recognition processing on the image of the commodity to identify one or more commodity candidates; and displaying the identified commodity candidates and then waiting for an input that selects one of the commodity candidates, wherein the posture of the operator that is in an upright state is detected when the head of the operator is located within a predetermined range.

14. The method according to claim 13, wherein executing commodity recognition processing includes performing object recognition using a dictionary file.

15. The method according to claim 14, further comprising:

storing the dictionary file in a storage device.

16. The method according to claim 13, wherein the image of the commodity and the first posture information are acquired by a camera.

* * * * *